(12) United States Patent
Ecklund et al.

(10) Patent No.: US 7,711,854 B2
(45) Date of Patent: May 4, 2010

(54) RETRIEVING DOCUMENTS OVER A NETWORK WITH A WIRELESS COMMUNICATION DEVICE

(75) Inventors: Terry Robert Ecklund, Overland Park, KS (US); Patrick Thomas O'Boyle, Kansas City, MO (US); Andrea Elise Barton, Overland Park, KS (US); Travis Scott Newkirk, Overland Park, KS (US); Damon Matthew Herbst, Shawnee, KS (US)

(73) Assignee: Accenture Global Services GmbH (CH)

( * ) Notice: Subject to any disclaimer, the term of this patent is extended or adjusted under 35 U.S.C. 154(b) by 1258 days.

(21) Appl. No.: 10/071,936

(22) Filed: Feb. 7, 2002

(65) Prior Publication Data

US 2005/0262220 A1 Nov. 24, 2005

(51) Int. Cl.
*G06F 15/16* (2006.01)
*G06F 15/173* (2006.01)
*G06F 17/00* (2006.01)

(52) U.S. Cl. .................. 709/246; 709/238; 715/234; 715/249

(58) Field of Classification Search ............... 709/219, 709/226, 246, 238; 715/513, 523; 235/472.01
See application file for complete search history.

(56) References Cited

U.S. PATENT DOCUMENTS

| | | | |
|---|---|---|---|
| 69,598 A * | 10/1867 | Herle | 416/173 |
| 5,327,529 A | 7/1994 | Fults et al. | |
| 5,727,159 A | 3/1998 | Kikinis | |
| 5,979,757 A * | 11/1999 | Tracy et al. | 235/383 |
| 6,430,624 B1 | 8/2002 | Jamtgaard et al. | |
| 6,955,298 B2 * | 10/2005 | Herle | 235/472.01 |
| 2002/0080267 A1 * | 6/2002 | Moluf | 348/385.1 |
| 2002/0091738 A1 * | 7/2002 | Rohrabaugh et al. | 707/517 |
| 2002/0120684 A1 * | 8/2002 | Christfort et al. | 709/203 |
| 2002/0161928 A1 * | 10/2002 | Ndili | 709/246 |
| 2003/0074475 A1 * | 4/2003 | Ollikainen | 709/246 |
| 2003/0169282 A1 * | 9/2003 | Herigstad et al. | 345/700 |
| 2003/0189913 A1 * | 10/2003 | Kim | 370/338 |

* cited by examiner

*Primary Examiner*—Larry Donaghue
*Assistant Examiner*—Asghar Bilgrami
(74) *Attorney, Agent, or Firm*—Brinks Hofer Gilson & Lione

(57) ABSTRACT

A computing system is provided that comprises a portable, hand-held computer comprising a display and a plurality of cursor control keys; and a proxy server coupled to the portable computer by a data link. A proxy server is also coupled to at least one remote server on the Internet. The portable computer is adapted to activate a menu comprised of a plurality of entries. Each entry corresponds to at least one mark-up language file to be accessed by the user. The method disclosed herein provides a shorthand way of requesting mark-up language files using one hand and a minimal number of keystrokes. Once the proxy server receives the file, it separates the file into viewable segments and sends the first viewable segment to the portable computer.

13 Claims, 15 Drawing Sheets

150

152 — accenture | Home About Accenture Investor Relations Map/Help Contact Us
Industries  Services  Locations  Ideas  Clients  Careers  Events  eCommerce

- Outlook Online                                                    Search: [        ]  — 156

158:
- Ideas Update Registration
- About Outlook Online
- Journal
- Special Edition
- Article Index
- Contact Us

Outlook Point of View

Request an e-mail alert when new articles are posted on this topic

Are technical challenges holding back your wireless strategy?

by Owen V. Perillo and Leo P. Rohlinger

Download PDF (8 1/2 x 11, 38 KB)

PDF Help                Download PDF (A4, 38 KB)

Ubiquitous commerce, or uCommerce—the ability to conduct business anywhere and at any time—is expected to vastly improve the way businesses operate and the way people live.

For consumers, uCommerce will become part of daily life, turning time previously spent waiting, walking and traveling into time spent communicating, working and buying. For businesses, uCommerce will be a critical capability in improving customer sales, service and loyalty, in driving more efficiency in the supply chain and in enabling the mobile workforce.

But implementing uCommerce solutions can be highly disruptive, and can affect all dimensions of a company's operating strategies. As a result, many companies are uncertain about how best to implement wireless solutions, which causes them to hold back on executing a uCommerce strategy.

Moving beyond wireless barriers?

We believe that companies today are only scratching the surface of what they can accomplish in the wireless world. And the highest hurdle they must overcome is their uncertainty about rapidly changing technologies. This concern is not ungrounded: While there is a need to act quickly, correctly anticipating the changes presented by evolving technologies is critical.

Accenture has developed a call to action to help companies manage the key technical challenges they face as they attempt to implement wireless business solutions.

- Bridge the generation gap
  *Challenge:* The wireless-provider industry lacks a clear migration path between current wireless data-access technologies (second generation), which have limited bandwidth, and super-speedy third-generation (3G) packet technologies. Promising speeds of up to 2Mbps, 3G technologies support real-time access to sustain high-quality audio/video and other bandwidth-intensive business and consumer applications.

But much of the hardware that operates on current wireless networks may not be supported as 3G infrastructures are deployed. What is more, coverage and compatibility challenges can stem from the multiple digital wireless standards currently used in the United States—time division multiple access (TDMA), code division multiple access (CDMA), cellular digital packet data (CDPD), global system for mobile communications (GSM) and others.

*What to do:* Companies should consider creating a modular set of uCommerce solution components, including the user access device, the wireless network, the gateway, the Web/application/data servers, and the legacy systems. As certain technologies and standards change, the companies will be able to swap out relevant components—without overhauling the entire infrastructure.

RETRIEVING DOCUMENTS OVER A NETWORK WITH A WIRELESS COMMUNICATION DEVICE

FIELD OF THE INVENTION

The present invention relates to a system and method for accessing information from a network, and more particularly, to a system and method for retrieving documents via a proxy server and routing them to a plurality of wireless communication devices.

DESCRIPTION OF THE PRIOR ART

To a large degree, the information age has been brought about by rapid advances in the field of computers, networking and communications. Increasingly, information which could formerly be presented in tangible, permanent media is reformatted and rendered for display and transmitted to remotely located screens and monitors. Virtually any type of data presentable as text and/or graphics is being converted into suitable electronic messages or packets for shuttling across networks, such as the Internet.

Networks typically provide an infrastructure for resources or content providers to make packets available through service providers to users who subscribe to the service. The actual transmission takes place over the communication links of various bandwidths and types which make up the network. Content providers typically store this electronic data on servers connected directly to the Internet in standard format. The data is broken down into packets and these packets are then transmitted over the communication link. Among the diverse types of information that may be placed on the Internet in this way are articles, news briefs and updates, weather maps, books, summaries, files, software, catalogues, documents, pictorials, video files, public records, commercial literature and so forth. The act of accessing this information has come to be known as "surfing."

Until recently, surfing the Internet and, more particularly the world wide web or web, was an activity restricted to users operating full-size client computers (e.g., lap-top, desktop, and mini computers) located in a home or business. This was true because the principal method for accessing the Internet required a computer with access to a special navigation program called a web browser or browser. Browsers allow a user to access servers located throughout the world, peruse the information stored on the servers and retrieve information from the servers by sending files or data packets from the server's resources to the user's computer. Historically, browsers were too large and complicated to be loaded in the memory of smaller, less capable clients such as wireless communication devices. This consequently limited access by wireless devices to the Internet and correspondingly delayed their widespread acceptance and use.

However, with the advent of wireless communication protocols, information stored on the Internet became accessible to wireless communication devices previously ill-equipped to access the Internet. For example, mobile phones, personal data assistants (PDAs) and other hand-held computers were suddenly capable of logging onto the Internet and retrieving data therefrom. While the combination of size and functionality led to the emergence of these computing devices as valuable necessities, it also prevented them from providing the features routinely accessible using a conventional computer keyboard and full-sized color monitor. Consequently, many existing hand-held computing devices still lack the functionality necessary to browse as effectively as a user on a conventional desktop computer.

Efforts have been made to increase Internet accessibility for these hand-held devices in spite of their existing processing and display capabilities. For example, U.S. Pat. No. 5,727,159 disclosed a system in which relatively low-end computers such as portable, battery-powered computers may be used to browse the Internet The system utilizes an arrangement comprised of a proxy server with adequate computing power to perform all web browsing and downloading functions for the portable computer. Recognizing that these small computers have limited processing and data display capabilities, the disclosed system provides the capability in the proxy server for transposing the downloaded files into an alternate, low-information density form suitable for rapid processing and display by connected portable computers. Unfortunately, in the process of transposing the data, the system leaves open the possibility that subtle but nevertheless important data could be removed or filtered out.

Under these circumstances, what is needed is a system and method for retrieving documents from a server and then routing them to small, portable computers in their original form. It is also desirable to have a system and method that allows a user to easily navigate through various types of documents with one hand, using the cursor keys typically found on PDA's, mobile telephones and other portable computing devices.

SUMMARY OF THE INVENTION

The present invention provides a system and method for retrieving documents from a network using a proxy server and routing them to a plurality of different types of wireless communication devices. In a preferred embodiment of the present invention, a wireless communication device is provided that includes a display and a plurality of cursor control keys. The wireless communication device is connected to a proxy server, preferentially through a base station of a wireless communication system. The proxy server is also coupled to at least one remote server via a network connection. During operation, the wireless communication device is programmed to generate a menu that includes a plurality of entries. Each entry provides a link to at least one web page that may be selected and accessed by the user of the wireless communication device.

In the preferred embodiment of the present invention, during operation a user that is logged onto the proxy server can scroll through menu items generated on the wireless communication device using cursor keys found on the wireless communication device to select a desired web site. Once the user selects a menu item from the menu, a site request that corresponds to the selected item from the menu is encoded and transmitted to the proxy server from the wireless communication device where the site request is then decoded into a universal resource locator (URL). The proxy server then contacts the site corresponding to the URL and the web page or markup language file is then retrieved from a remote server that is connected to the network.

The present invention provides a shorthand way of requesting web pages using one hand and a minimal number of keystrokes. Once the proxy server receives the mark-up language file, it separates the file into a predetermined number of viewable segments and then sends the first viewable segment to the wireless communication device. After the user has perused the received text and/or graphics sent in the first viewable segment, they are able to request the next viewable segment and so on. This process continues until the user of the wireless communication device has received the entire mark-up language file or decides to access another mark-up language file altogether.

Additional objectives, features and advantages of the present invention are set forth in the following description, apparent from the description, or may be learned by practicing the invention. Both the foregoing general description and the following detailed description are exemplary and explanatory and are intended to provide further explanation of the invention as claimed.

BRIEF DESCRIPTION OF THE DRAWINGS

FIG. 11 is an example of a mark-up language file retrieved from the Internet by a preferred embodiment of the present invention;

DETAILED DESCRIPTION OF THE PRESENTLY PREFERRED EMBODIMENTS OF THE INVENTION

Figure 1:
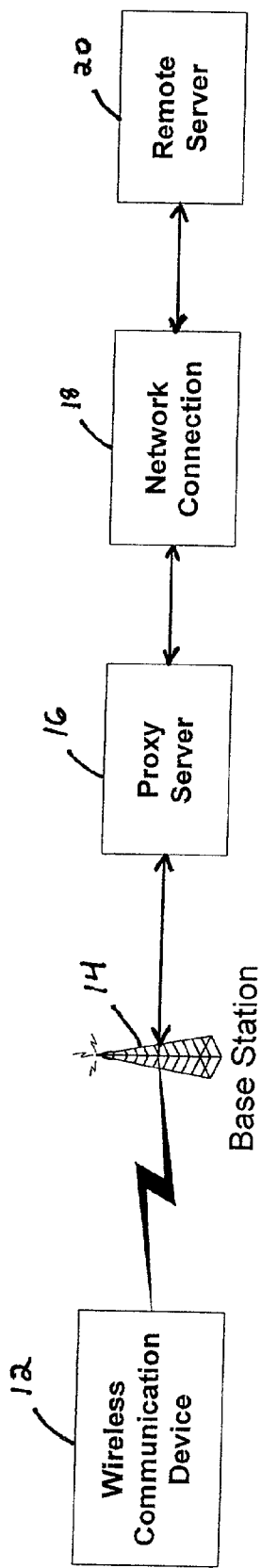
FIG. 1 is a block diagram of a wireless communication network including an arrangement constructed in accordance with the subject invention.

Referring to FIG. 1, the present invention discloses a proxy network system 10 that includes at least one wireless communication device 12 that is equipped with a display and a plurality of cursor control keys. The wireless communication device 12 is connected to a base station 14, which is in turn, connected to a proxy server 16. The base station 14 is used to transmit and receive radio signals to and from the wireless communication device 12. The proxy server 16 is connected to a network connection 18 that is connected to at least one remote server 20. Although not specifically illustrated in FIG. 1, preferentially the network connection 18 is an Internet connection that connects the proxy server 16 to the Internet.

Figure 3:
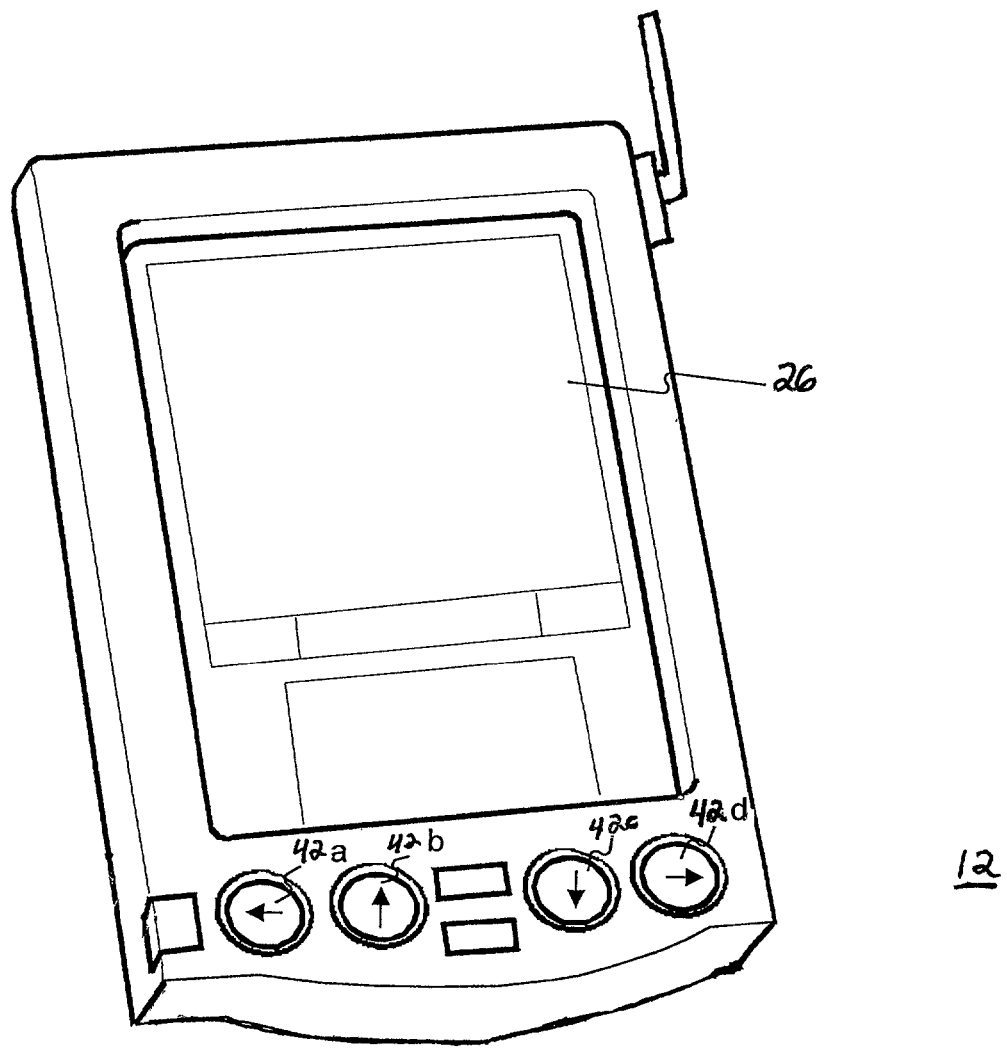
FIG. 3 is a figure of the outward appearance of an illustrative wireless communication device of FIG. 1.

During operation, the wireless communication device 12 is programmed to generate a menu comprised of a plurality of entries. Each entry corresponds to a link to at least one mark-up language file that can be accessed by the user of the wireless communication device 12. As such, a user of the wireless communication device 12 can scroll through the menu items using the cursor keys found on the wireless communication device 12 to select a desired site. Once the user locates and selects a desired listing from the menu, a site request is encoded and transmitted to the proxy server where the site request is then decoded into a corresponding URL. The URL is then used by the proxy server 16 to contact the appropriate remote server 20 and the mark-up language file corresponding to the site request is retrieved from the remote server 20. This method provides a shorthand way of requesting and scrolling from one screen to another. Operation of the cursor keys 42a-d will be explained in more detail in FIGS. 8, 13 and 14. Those skilled in the art should recognize that although a PDA is illustrated in FIG. 3, other types of wireless communication devices may be used.

Figure 4:
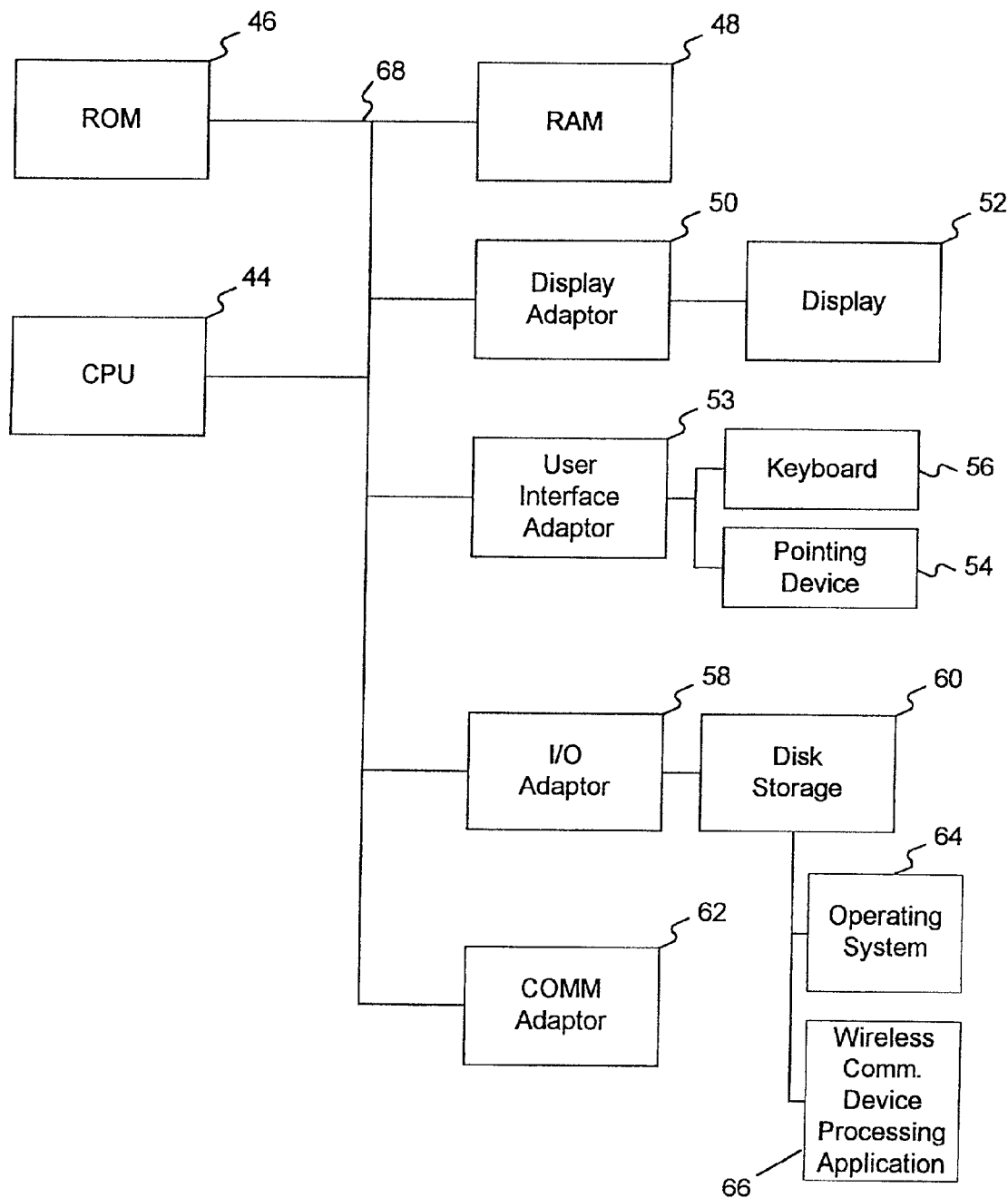
FIG. 4 is a more detailed block diagram of the proxy server of FIG. 1.

A detailed diagram of the proxy server 16 is illustrated in FIG. 4. Proxy server 16 is comprised of a CPU 44, a ROM 46, a RAM 48, a display adapter 50, a display 52, a User Interface (UI) adapter 53, a mouse or selection device 54, a keyboard 56, an IO adapter 58, a disk storage unit 60, and a communication adapter 62. The proxy server 16 includes an operating system 64 and a wireless communication device processing application 66 that is stored on the disk storage unit 60. As shown, the various components of each proxy server 16 communicate through a system bus 68 or similar architecture.

Figure 2:
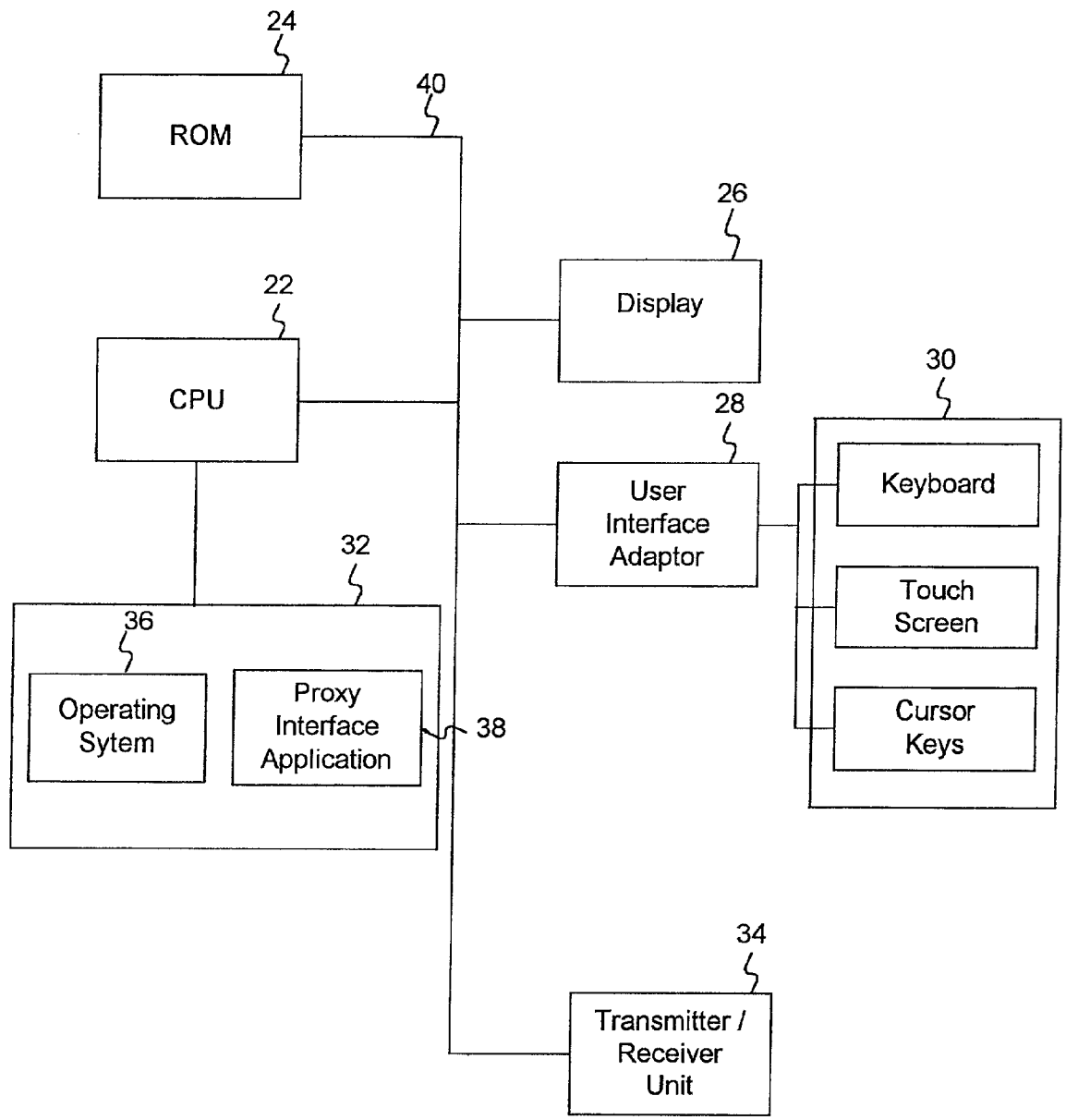
FIG. 2 is a more detailed block diagram of the wireless communication drive of FIG. 1.
Figure 5:
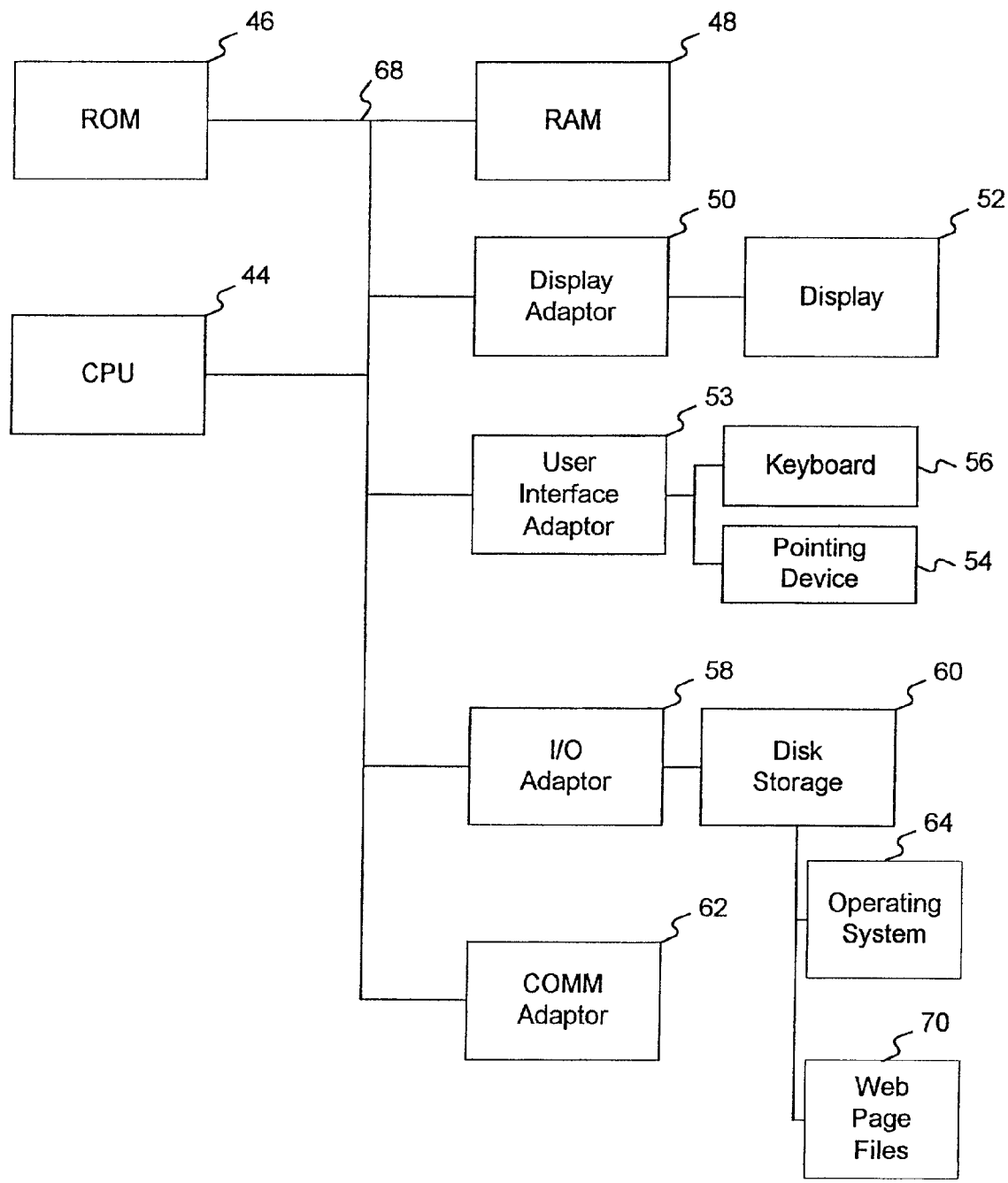
FIG. 5 is a more detailed block diagram of the remote server of FIG. 1.

A detailed diagram of the remote server 20 is shown in FIG. 5. As illustrated, the remote server 20 is comprised of the same hardware components as the proxy server 16 and as such, a detailed discussion of those components is not necessary. Stored on disk storage unit 60 of the remote server 20 is the data content, mark-up language files 70 associated with the respective remote server 20. In connection with the preferred embodiment, it should be appreciated from the schematic overview illustrated by FIG. 1 and the detailed schematics of FIGS. 2, 4 and 5 that the present invention may be employed in a distributed computer system environment which has internal, external and intranet networks collectively represented in the schematic overview by the network connection 18 to connect the wireless communication device 12 to World Wide Web servers and other servers, which are represented generally by remote server 20 in the various figures.

Figure 6:
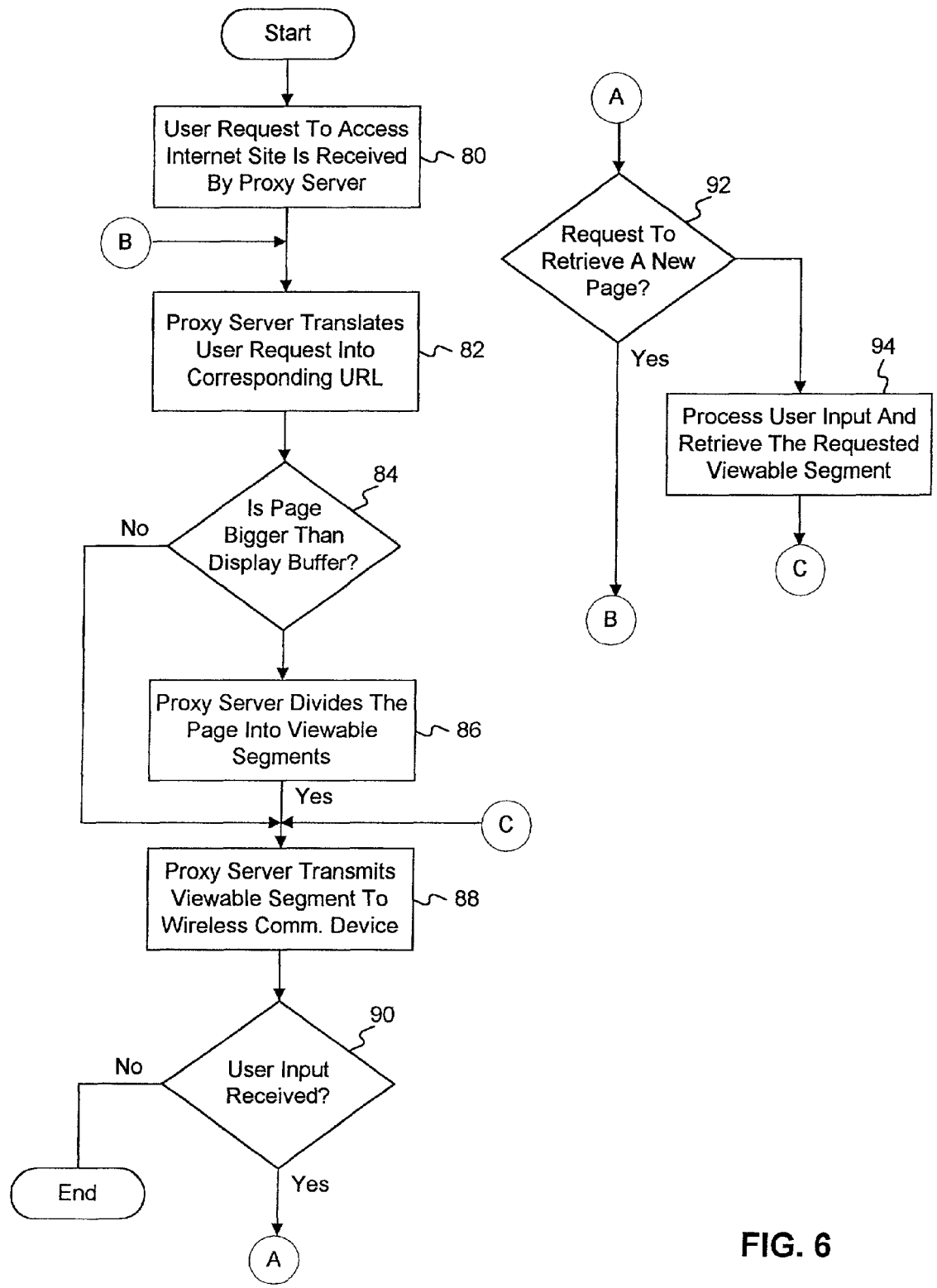
FIG. 6 is a flow chart of a preferred embodiment of the proxy interface program.

Referring now to FIG. 6, the exemplary sequential steps of the proxy interface application 38 and the wireless communication device processing application 66 are illustrated for implementing the method for retrieving documents over the Internet in accordance with a preferred embodiment of the present invention. Note that in this description, the proxy server 16 is generally discussed as if it were a single device, and functions provided by the proxy server 16 are generally discussed as being performed by such single device. It is important however to note that the proxy server 16 preferentially comprises multiple physical and logical devices connected in a distributed architecture, and the various functions discussed below which are provided by the proxy server 16 may actually be distributed among multiple server devices.

Figure 7A:
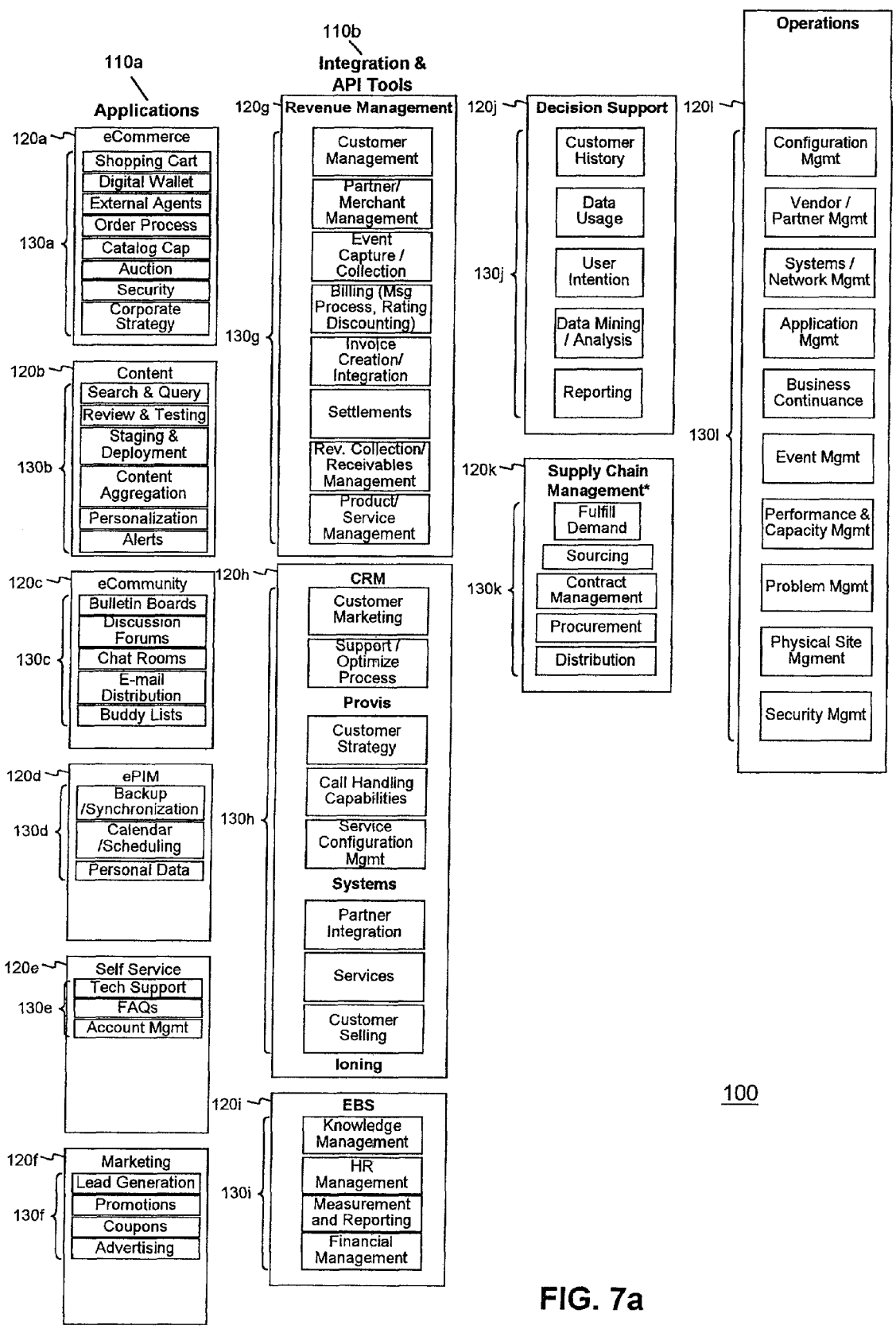
FIG. 7 is a diagram of the menu hierarchy in accordance with a preferred embodiment of the subject invention.
Figure 7B:
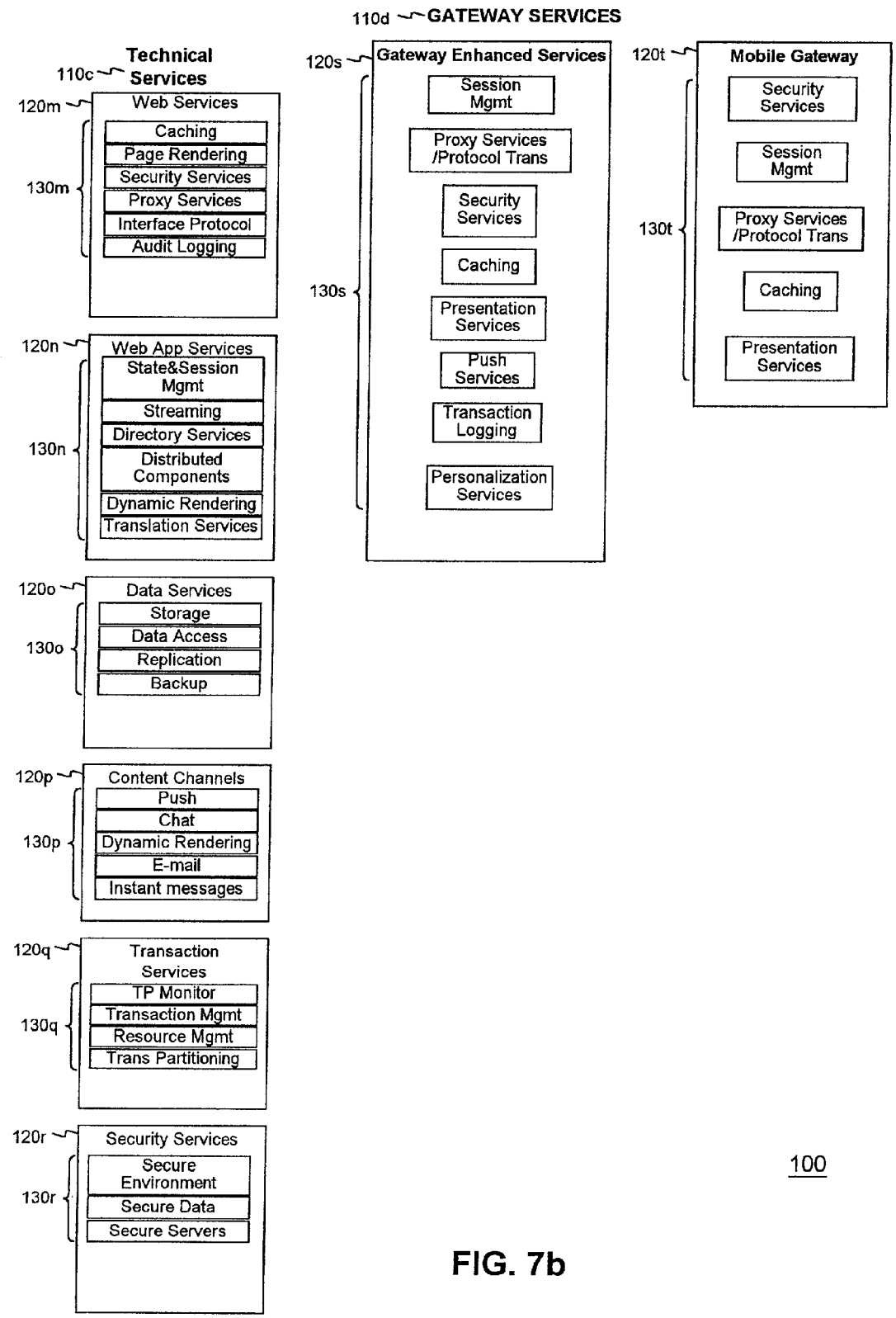

As illustrated in FIG. 6, a user action in the form of a request to access a mark-up language file is generated by the wireless communication device 12 and is received by the proxy server 16 at step 80. The request is communicated to the proxy server 16 when a user operating the wireless communication device 12 preferentially selects a menu item displayed by the proxy interface application 38. FIGS. 7a and 7b show an example of a menu hierarchy 100 in accordance with a preferred embodiment of the present invention. As shown in FIG. 7, menu 100 is comprised of a plurality of headings 110a-d and subheadings 120a-t with associated menu items 130a-t.

After the request from the wireless communication device 12 is received by the proxy server 16, a site request is generated by wireless communication device processing application 66 that corresponds to a universal resource locator (URL) at step 82. Preferentially, the request from the wireless communication device 12 is sent as an encoded message that is decoded by the proxy server 16. In the preferred embodiment, the proxy server 16 is also capable of determining the size of the display buffer associated with the display 26 of the wireless communication device 12. At step 84, the wireless communication device processing application 66 on the proxy server 16 obtains the requested mark-up language file from the remote server 20 and determines if the mark-up language file is larger than the display buffer of the wireless communication device 12. If the web page is smaller than the display buffer, the proxy server 16 transmits the entire mark-up language file to the wireless communication device 12 as illustrated at step 88.

As further illustrated in FIG. 6, if the mark-up language file is larger than the display buffer, the wireless communication device processing application 66 on the proxy server 16 divides the mark-up language file into viewable segments that fit within a predetermined viewable area of the display 26 of the wireless communication device 12. After being divided into viewable segments, the first viewable segment of the mark-up language file is transmitted to the wireless communication device 12. At step 90, if another user input is received by the proxy server 16, then the wireless communication device processing application 66 determines if the request is for a new mark-up language file or another viewable segment of the mark-up language file already selected, which is illustrated at steps 92 and 94 respectively. If the user has requested a new web page, then the wireless communication device processing application 66 returns to step 82 and, if the user requests the next viewable segment of the currently selected web page, then the application returns to step 88. Those skilled in the art should recognize that this allows users to scroll through various viewable segments of the mark-up language file.

Figure 8:
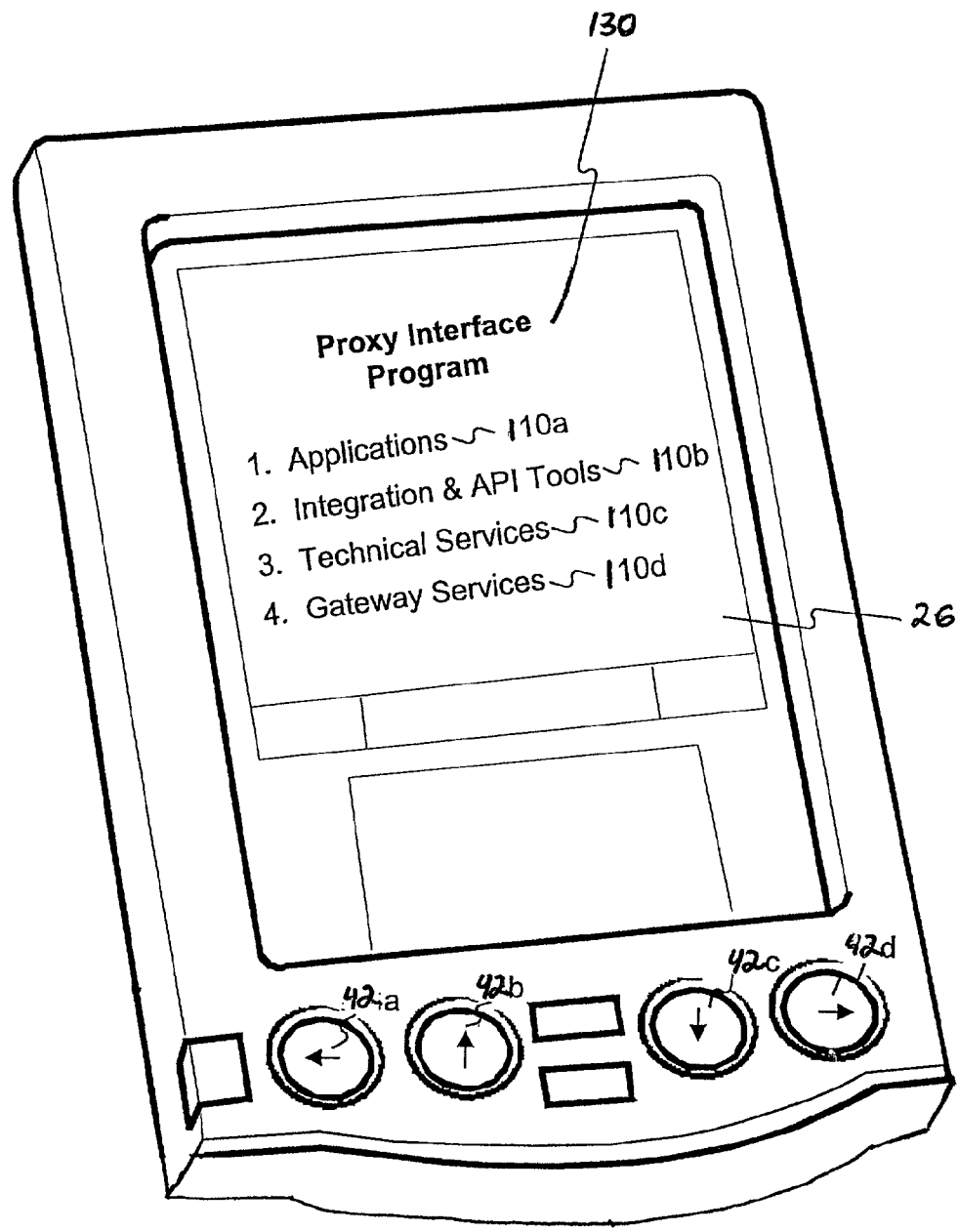
FIG. 8 is an image of an inquiry screen in accordance with a preferred embodiment of the subject invention.
Figure 9:
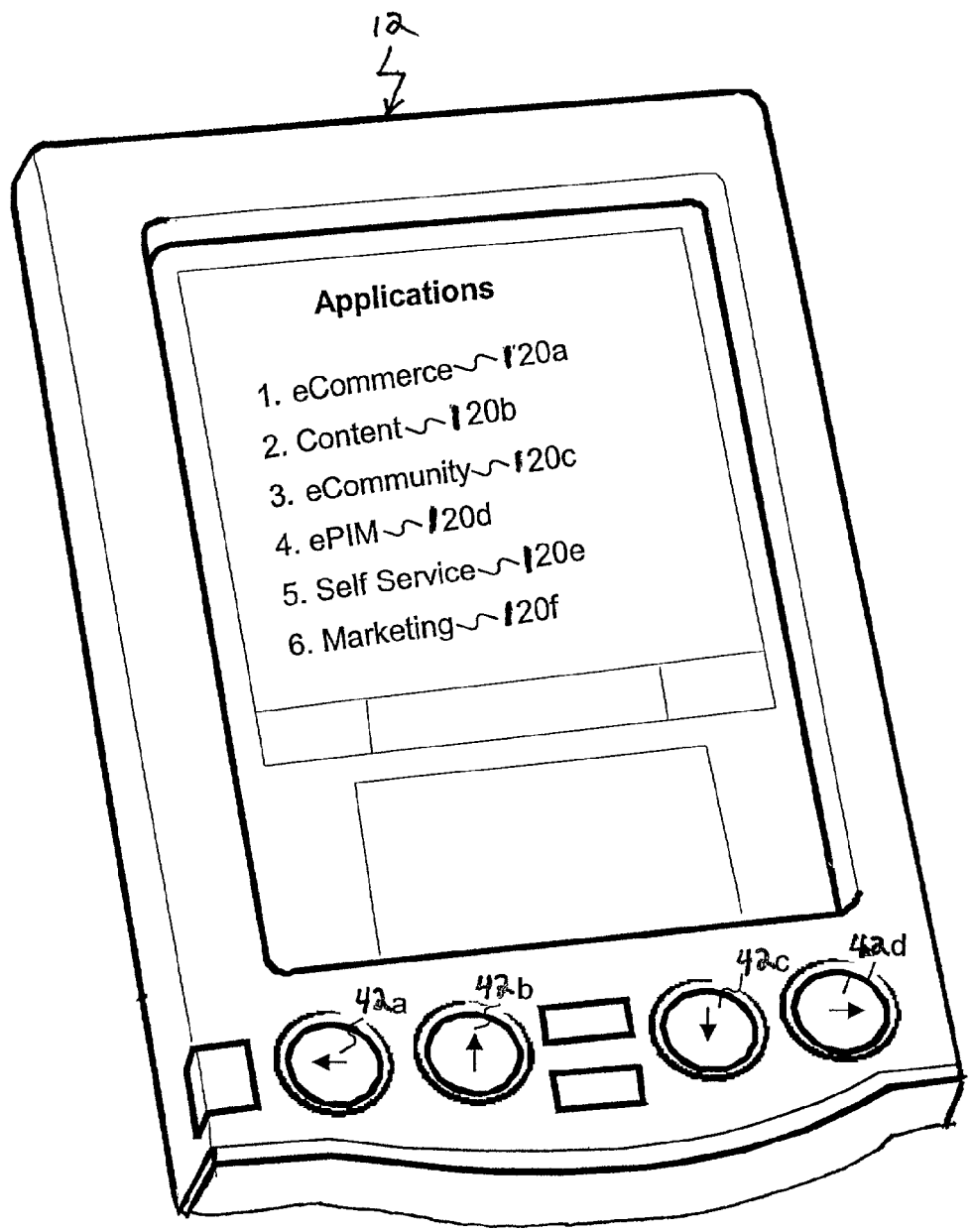
FIG. 9 is an image of a second display screen in accordance with a preferred embodiment of the subject invention.
Figure 10:
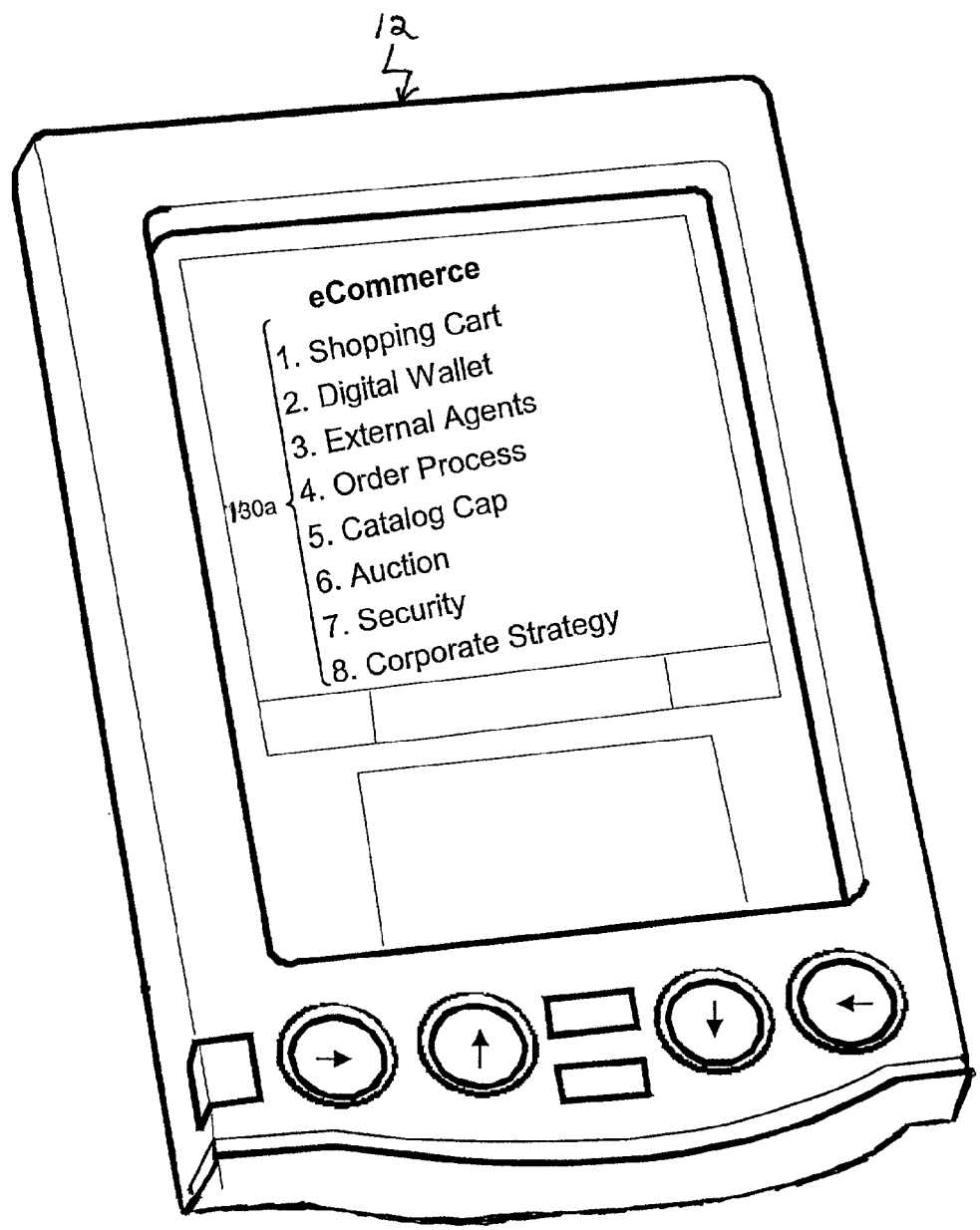
FIG. 10 is an image of a third display screen in accordance with a preferred embodiment of the subject invention.

Referring to FIG. 8, an inquiry screen 130 is illustrated in the form that is displayed on the display 26 of the wireless communication device 12 after being connected to the proxy server 16. The entire screen contains a plurality of objects or menu items associated with predetermined selections. Once the inquiry screen 130 is displayed, the user can interact with it, for example, by selecting one of the headings 110a-d using the user input device 30 or some other method. For example, should the user want access to a category on the menu in accordance with the present invention, he or she would select heading 110a. This would take the user to the application screen, which is illustrated in FIG. 9. Next, the user would select one of the displayed subheadings 120a-f. Assuming the user selects subheading eCommerce 120a, he or she will next be presented with a plurality of menu items 130a as shown in FIG. 10.

Once the user selects a menu item, the proxy interface application 38 encodes the selection for the selected item and transmits it to the proxy server 16 for processing. Assuming the user selects 'Corporate Strategy,' the proxy interface application 38 would transmit a predetermined identifier corresponding to the selected menu item. In the previous example, the proxy interface application 38 would possibly transmit the identifier '1-1-8' which corresponds to the users selections: 1(Applications)-1(eCommerce)-8(Corporate Strategy). While this specification assumes that the proxy interface application 38 encodes an identifier corresponding to the item numbers shown on the input screens displayed by the proxy interface application 38, various encoding schemes could be implemented without departing from the scope and intent of this application. In other embodiments, the actual URL could be encoded and transmitted to the proxy server 16 where it is decoded and processed.

When the proxy server 16 receives the encoded identifier, it preferentially decodes it into a URL and retrieves the web page associated with that URL from a remote server 20. As an example, assume the received code translates into the following URL: "http://www.accenture.com/xd/xd.asp?it=enWeb&xd=ideas/outlook/pov/pov_wirestrat.xml," the proxy server 16 would retrieve an illustrative mark-up language file 150 illustrated in FIG. 11. As shown, the mark-up language file 150 is comprised of a graphics portion 152, a text portion 154, a query box 156 and a plurality of links 158. Once the mark-up language file 150 is retrieved, the proxy server 16 determines whether the entire mark-up language file 150 is larger than the display buffer. If it is, the proxy server 16 divides the mark-up language file into viewable segments for transmission to the wireless communication device 12 one viewable segment at a time. The proxy server 16 may access a display information setting that is stored on the wireless communication device 12.

Figure 12:
FIG. 12 is an example of the mark-up language file of FIG. 11 partitioned into "digestible" bites.

In the preferred embodiment, the information contained in the display information setting is used to determine the maximum size of the mark-up language file that can be transmitted to the wireless communication device 12 without exceeding its memory and display capabilities. FIG. 12 illustrates a possible segmentation of a mark-up language file 150 that would permit viewable segments of the mark-up language file to be transmitted to the wireless communication device 12, without overburdening its memory and display capabilities. It is envisioned that in addition to transmitting viewable segments of the mark-up language file 150, the wireless communication device processing application 66 also segments the mark-up language file 150 along logical boundaries (e.g., page breaks, line feeds, etc.) to maximize clarity of the transmitted text. As shown in FIG. 12, mark-up language file 150 is divided into segments 160a-d. Next, the wireless communication device processing application 66 encodes and transmits viewable segment 160a to the wireless communication device 12, along with a navigational aid 170 (shown in FIG. 13) to aid the user in scrolling through the viewable segments 160a-d of the mark-up language file 150. If the retrieved web page is not larger than the display buffer in the wireless communication device 12, processing flows directly from step 84 to step 88 as illustrated in FIG. 6.

Figure 13:
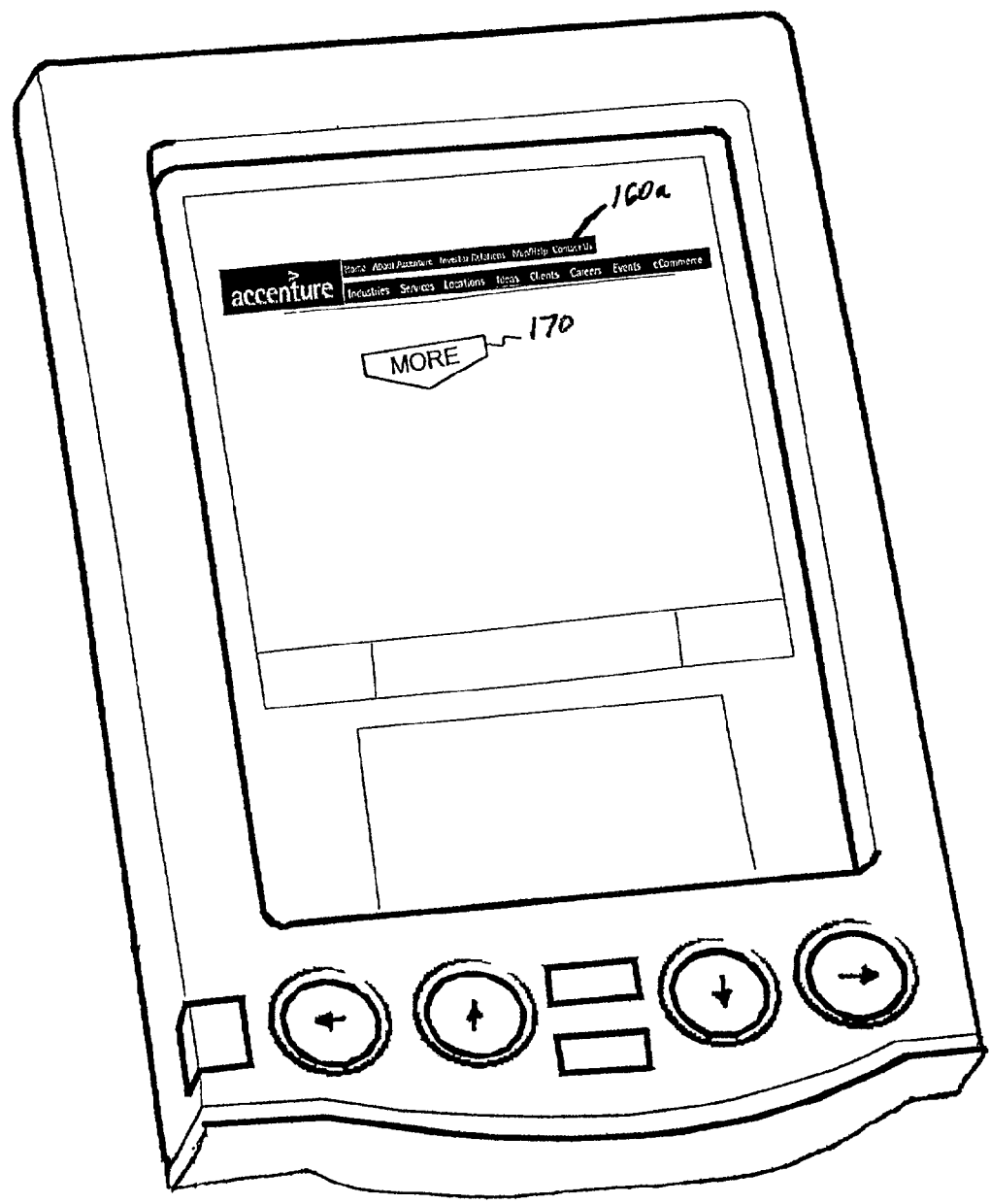
FIG. 13 is an image of a first portion of a mark-up language file shown on a display of a computer in accordance with a preferred embodiment of the subject invention.

As shown in FIG. 13, when the wireless communication device 12 retrieves segment 160a, it preferentially displays it as it would appear on a typical laptop or desktop computer. Also shown in the screen is the navigational aid 170 for directing the retrieval order of the next viewable segment 160a-d from the proxy server 16. The wireless communication device 12 waits for input from the user (step 90). When the wireless communication device 12 receives input, it determines whether the user is requesting a new mark-up language file 150 or simply progressing down or up the current mark-up language file 150. If the wireless communication device 12 determines that the user is directing it to retrieve the next viewable segment 160a-d of the current mark-up language file 150, processing flows to step 94. For example, if the user selects the navigational aid 170 via a touch screen, keyboard or selection buttons, the screen shown in FIG. 14 will be displayed, which is viewable segment 160b in this example. It is also important to note that the user may activate cursor keys 42a-d to navigate the web page. If the wireless communication device 12 determines that the user is directing it to retrieve a new page, as previously set forth processing flows to step 82 and processing proceeds as explained above.

Although not specifically illustrated, the mark-up language file 150 may also be encoded by the proxy server 16 to allow the wireless communication device 12 into a different form. This would be a form that is compatible with the wireless communication device 12. The user may also be allowed to scroll left and right on the screen.

Figure 14:
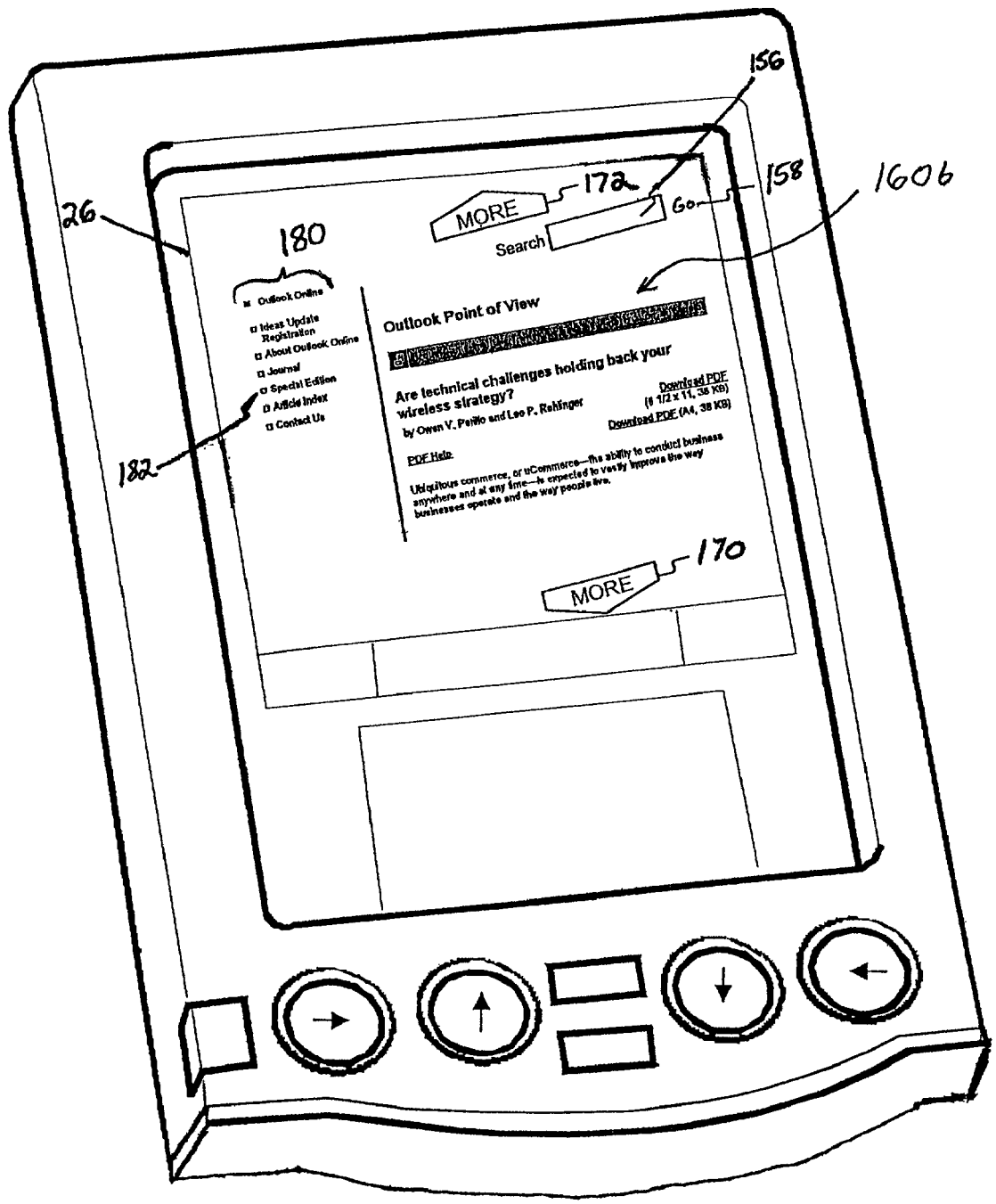
FIG. 14 is an image of a second portion of a mark-up language file shown on a display of a computer in accordance with a preferred embodiment of the subject invention.

As shown in FIG. 14, once the user selects the navigational aid 170, viewable segment 160b is then transmitted to the wireless communication device 12. Since mark-up language file 150 extends in both directions (top and bottom) from segment 160b, a second navigational aid 172 is displayed in addition to the first navigational aid 170. Although not illustrated, if the width of web page 150 extended beyond the left or right boundaries of display 26, a left and/or a right navigational would also be displayed. Also shown in FIG. 14 is query box 156 with its associated activation button 158, and a plurality of links 180 with associated activation buttons 182. When a user wants to enter a search query, he or she enters a search request into the query box 156 and then activates button 158, which causes the wireless communication device processing application 66 to immediately transmit the search query back to the proxy server 16. Once the proxy server 16 receives the search query, it passes the search query to the appropriate remote server 20. When the proxy server 16 receives the response from the remote server 20, it processes the mark-up language file 150 as previously described. A similar process is performed in the event that the user selects button 182.

The entire mark-up language file 150 may be transmitted to the wireless communication device 12 during a single transmission. As such, the wireless communication device 12 may break up the mark-up language file 150 in other preferred embodiments. It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A wireless communication system, comprising a remote server including a predetermined mark-up language file; a proxy server configured to communicate with said remote server, wherein said proxy server is programmed to receive a request to retrieve said predetermined mark-up language file, wherein said request is transmittable from a wireless communication device, wherein said request received from said wireless communication device is generated in response to selection of a menu item from among a plurality of menu items displayable with said wireless communication device, wherein said request comprises an identifier that identifies a location for said selected menu item within a hierarchy for said plurality of menu items, and wherein said request is to retrieve said predetermined mark-up language file, said request being in a first format that is converted into a second format by said proxy server, said second format being used to retrieve said predetermined mark-up language file from said remote server, wherein said proxy server is configured to divide said predetermined mark-up language file into a plurality of viewable segments, said plurality of viewable segments being a predetermined number of viewable segments, including a first viewable segment, a second viewable segment and a third viewable segment, said first viewable segment and said second viewable segment each being sized less than a display buffer and sized to fit within a viewable area of a display screen of said wireless communication device so that a whole of any one of said viewable segments and a first navigation aid are viewable at the same time in said viewable area of said display screen, wherein said proxy server is further configured to generate said first navigation aid, a second navigation aid and a third navigation aid, wherein said proxy server is further configured to transmit said first viewable segment and said navigation aid in response to said request, said navigation aid being selectable with said wireless communication device to request said second viewable segment, said navigation aid being configured to graphically indicate whether other viewable segments adjacent to said first viewable segment in the mark-up language file are above, below, right, or left of said first viewable segment, wherein said proxy server is further configured to transmit said second navigation aid and said third navigation aid with said second viewable segment in response to receipt from said wireless communication device of a selection of said first navigation aid, said second navigation aid being selectable with said wireless communication device to request said first viewable segment and said third navigation aid being selectable with said wireless communication device to request said third viewable segment, wherein said proxy server is further configured to transmit said first viewable segment in response to receipt from said wireless communication device of selection of said second navigation aid, and wherein said proxy server is further configured to transmit said third viewable segment in response to receipt from said wireless communication device of selection of said third navigation aid.

2. The wireless communication system of claim 1, wherein said proxy server is configured to convert said viewable segments into a format compatible with said wireless communication device.

3. A method of retrieving mark-up language files over a wireless communication network, comprising: receiving an encoded request transmittable from said wireless communication device, said encoded request containing a request for a predetermined mark-up language file and an identifier that identifies a location for said encoded request within a hierarchy for a plurality of encoded request; decoding said encoded request; retrieving said predetermined mark-up language file from a remote server; dividing said predetermined mark-up language file into a plurality of viewable segments, said plurality of viewable segments comprising a predetermined number of viewable segments, said plurality of viewable segments including a first viewable segment, a second viewable segment and a third viewable segment, said first viewable segment and said second viewable segment each being sized to fit within a display buffer and sized to fit within a viewable area of a display screen of said wireless communication device; generating a first navigation aid, a second navigation aid and a third navigation aid configured to direct retrieval of one of said plurality of viewable segments, wherein said first navigation aid and said first viewable segment or said second viewable segment are viewable simultaneously in said viewable area of said display screen, said first navigation aid being configured to graphically indicate whether other viewable segments adjacent to said first viewable segment or said second viewable segment in the mark-up language file are above, below, right, or left of said first viewable segment or said second viewable segment; transmitting said first viewable segment and said navigation aid to said wireless communication device; transmitting said second navigation aid and said third navigation aid with said second viewable segment in response to receipt from said wireless communication device of selection of said first navigation aid, said second navigation aid being selectable with said wireless communication device to request said first viewable segment and said third navigation aid being selectable with said wireless communication device to request said third viewable segment; transmitting said first viewable segment in response to receipt from said wireless communication device of selection of said second navigation aid; and transmitting said third viewable segment in response to receipt from said wireless communication device of selection of said third navigation aid.

4. The method of claim 3, further comprising:
encoding said viewable segments into a format that is compatible with said wireless communication device.

5. A computer network for providing information to a wireless communication device, comprising: a processor; a memory in communication with said processor, said memory configured to store proxy server logic executable by said processor to: receive a request transmittable from said wireless communication device in a first format, wherein said request is to retrieve a predetermined mark-up language file residing on a remote server, and wherein said request comprises an identifier that identifies a location for said request within a hierarchy for a plurality of requests; convert said request into a second format; transmit said request to said remote server; receive a response to said request from said remote server; separate said response into a plurality of viewable segments, said plurality of viewable segments comprising a predetermined number of viewable segments, wherein said plurality of viewable segments include a first viewable segment, a second viewable segment and a third viewable segment, wherein each of said viewable segments are sized in accordance with a display buffer and sized to fit within a display of said wireless communication device so that an entirety of said first viewable segment or said second viewable segment is displayable simultaneously in said display of said wireless communication device; generate a first navigation aid, a second navigation aid and a third navigation aid; transmit said first viewable segment and said first navigation aid to said wireless communication device, wherein said first navigation aid is configured to graphically indicate whether other viewable segments adjacent to said first viewable segment in the mark-up language file are above, below, right, or left of said first viewable segment; transmit said second navigation aid and said third navigation aid with said second viewable segment in response to receipt from said wireless communication device of selection of said first navigation aid, said second navigation aid being selectable with said wireless communication device to request said first viewable segment and said third navigation aid being selectable with said wireless communication device to request said third viewable segment, transmit said first viewable segment in response to receipt from said wireless communication device of selection of said second navigation aid, and transmit said third viewable segment in response to receipt from said wireless communication device of selection of said third navigation aid.

6. The computer network of claim 5, wherein said memory is further configured to store proxy server logic executable by said processor to transmits said viewable segments to said wireless communication device in a format that is compatible with said wireless communication device.

7. A wireless communication system, comprising: a remote server including a predetermined mark-up language file; a proxy server configured to communicate with said remote server, wherein said proxy server is configured to receive a request transmittable from a wireless communication device, wherein said request is to retrieve said predetermined mark-up language file, said request being in a first format that is converted to a second format by said proxy server, said second format usable to retrieve said predetermined mark-up language file from said remote server, wherein said request comprises an identifier that identifies a location for said request within a hierarchy for a plurality of requests, wherein said proxy server is further configured to divide said predetermined mark-up language file into a predetermined number of viewable segments including a first viewable segment, a second viewable segment and a third viewable segment, said first viewable segment and said second viewable segment each being sized to fit within a display of said wireless communication device so that a whole of said first viewable segment or said second viewable segment is viewable in said display, wherein said proxy server is configured to generate a first navigation aid associated with said first viewable segment, a second navigation aid associated with said second viewable segment, and a third navigation aid, wherein said proxy server is further configured to transmit said first viewable segment and said first navigation aid in response to said request, said first navigation aid being selectable with said wireless communication device to request said second viewable segment, said navigation aid being configured to graphically indicate whether other viewable segments adjacent to said first viewable segment in the mark-up language file are above, below, right, or left of said first viewable segment, wherein said proxy server is further configured to transmit said second viewable segment, said second navigation aid and said third navigation aid upon receipt of a selection of said first navigation aid by said wireless communication device, said second navigation aid being selectable with said wireless communication device to request said first viewable segment and said third navigation aid being selectable with said wireless communication device to request said third viewable segment, wherein said proxy server is further configured to transmit said first viewable segment in response to receipt from said wireless communication device of selection of said second navigation aid, and wherein said proxy server is further configured to transmit said third viewable segment in response to receipt from said wireless communication device of selection of said third navigation aid.

8. A method of retrieving mark-up language files over a wireless communication network, comprising: receiving a request for a predetermined mark-up language file from a wireless communication device, wherein said request comprises an identifier that identifies a location for said request within a hierarchy for a plurality of requests; retrieving said predetermined mark-up language file from a remote server; dividing said predetermined mark-up language file into a plurality of viewable segments that are sized to fit within a viewable area of a display screen of said wireless communication device, said plurality of viewable segments being a predetermined number of viewable segments including a first viewable segment, a second viewable segment and a third viewable segment; generating a first navigation aid, a second navigation aid and a third navigation aid configured to direct retrieval of said second viewable segment and said first viewable segment, respectively, wherein said first navigation aid and said second navigation aid are configured to graphically indicate whether other viewable segments adjacent to said first viewable segment in the mark-up language file are above, below, right, or left of said first viewable segment transmitting said first navigation aid and said first viewable segment to said wireless communication device, a whole of said first viewable segment being viewable in its entirety simultaneously in said display screen; in response to receipt from said wireless communication device of selection of said first navigation aid, transmitting said second navigation aid, said second viewable segment and said third navigation aid to said wireless communication device, a whole of said second viewable segment being viewable in its entirety simultaneously in said display screen; in response to receipt from said wireless communication device of selection of said second navigation aid, transmitting said first viewable segment and said first navigation aid to said wireless communication device, and in response to receipt from said wireless communication device of selection of said third navigation aid, transmitting said third viewable segment.

9. A method of retrieving mark-up language files over a wireless communication network, comprising: receiving with a proxy server a request for a predetermined mark-up language file from a wireless communication device, wherein said request comprises an identifier that identifies a location for said request within a hierarchy for a plurality of requests; retrieving with said proxy server said predetermined mark-up language file from a remote server; dividing with said proxy server said predetermined mark-up language file into a plurality of viewable segments that are sized to fit within a viewable area of a display screen of said wireless communication device, said plurality of viewable segments being a predetermined number of viewable segments including a first viewable segment, a second viewable segment and a third viewable segment; generating a navigation aid configured to direct retrieval of said second viewable segment, wherein said navigation aid is a first navigation aid, and generating a second navigation aid and a third navigation aid; transmitting with said proxy server said navigation aid and said first viewable segment to said wireless communication device, said navigation aid selectable to request said second viewable segment, said navigation aid being configured to graphically indicate whether other viewable segments adjacent to said first viewable segment in the mark-up language file are above, below, right, or left of said first viewable segment, transmitting with said proxy server said second navigation aid and said third navigation aid with said second viewable segment in response to receipt from said wireless communication device of selection of said first navigation aid, said second navigation aid being selectable with said wireless communication device to request said first viewable segment and said third navigation aid being selectable with said wireless communication device to request said third viewable segment, transmitting with said proxy server said first viewable segment in response to receipt from said wireless communication device of selection of said second navigation aid, and transmitting with said proxy server said third viewable segment in response to receipt from said wireless communication device of selection of said third navigation aid.

10. The method of claim 9, wherein said size of said viewable area of said display screen is determined by querying with said proxy server said wireless communication device.

11. The wireless communication system of claim 7, wherein the whole of one of said first viewable segment or said second viewable segment and at least one of said first navigation aid or said second navigation aid are viewable simultaneously in said display.

12. The method of claim 9, further comprising:
generating a menu with said wireless communication device, wherein said menu includes a plurality of menu items selectable with an input device included in said wireless communication device,
wherein said plurality of menu items include an integration and application programming interface (API) tools menu item, a technical services menu item, and a gateway services menu item,
wherein said menu is displayable only when said wireless communication device is in communication with said proxy server;
receiving a selection of a menu item from said menu items with said input device; and
generating said request for said predetermined mark-up language file from said selected menu item.

13. A method of retrieving mark-up language files over a wireless communication network, comprising: transmitting with a proxy server a menu that includes a plurality of selectable menu items to a wireless communication device, said menu only displayable when said wireless communication device is in communication with said proxy server, and each of said menu items associated with a respective one of a plurality of requests for predetermined mark-up language files; receiving a request for a predetermined mark-up language file from a wireless communication device based on selection of a menu item from said menu with said wireless communication device, wherein said request comprises an identifier that identifies a location for said request within a hierarchy for said plurality of requests; retrieving said predetermined mark-up language file from a remote server; dividing said predetermined mark-up language file into a plurality of viewable segments that are sized to fit within a viewable area of a display screen of said wireless communication device, said plurality of viewable segments being a predetermined number of viewable segments including a first viewable segment, a second viewable segment and a third viewable segment; generating a first navigation aid and a second navigation aid configured to direct retrieval of said second viewable segment and said first viewable segment, respectively, and generating a third navigation aid; transmitting said first navigation aid and said first viewable segment to said wireless communication device, a whole of said first viewable segment being viewable in its entirety simultaneously in said display screen, said navigation aid being configured to graphically indicate whether other viewable segments adjacent to said first viewable segment in the mark-up language file are above, below, right, or left of said first viewable segment; in response to selection of said first navigation aid with said wireless communication device, transmitting said second navigation aid, said second viewable segment and said third navigation aid to said wireless communication device, a whole of said second viewable segment being viewable in its entirety simultaneously in said display screen; in response to selection of said second navigation aid with said wireless communication device, transmitting said first viewable segment and said first navigation aid to said wireless communication device and in response to selection of said third navigation aid, transmitting said third viewable segment.

* * * * *